(12) United States Patent
Mitra (10) Patent No.: US 6,973,460 B1
(45) Date of Patent: Dec. 6, 2005

(54) FRAMEWORK FOR APPLYING OPERATIONS TO NODES OF AN OBJECT MODEL

(75) Inventor: Kanchan Mitra, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 10/304,222

(22) Filed: Nov. 26, 2002

(51) Int. Cl.$^7$ .............................. G06F 7/00; G06F 17/30
(52) U.S. Cl. .............................. 707/103 R; 707/104.1; 707/101
(58) Field of Search ........................ 707/103 R, 104.1, 707/101

(56) References Cited

U.S. PATENT DOCUMENTS 6,381,743 B1 * 4/2002 Mutschler, III ............. 717/104

* cited by examiner

*Primary Examiner*—Mohammad Ali
*Assistant Examiner*—Thanh-Ha Dang
(74) *Attorney, Agent, or Firm*—Banner & Witcoff, Ltd (57) ABSTRACT

A framework may include an object model and services. The framework may gather information at run-time from metadata within the object model before the framework operates on the classes. For a class within the object model, a subclass may be generated for containing pertinent metadata about the class. Through annotations of class members, the framework may determine the various types of data within the framework. This hierarchy information may specify how objects within the object model relate to one another. An annotation set within the subclass may contain information specifying how members of the class should behave, including, which services of the framework the class member should participate in and how the class member should participate. The annotations may be used for indicating how services of the framework should persist data to various storage units, such as an XML file and/or a database table.

18 Claims, 4 Drawing Sheets

| Flag | Semantics |
|---|---|
| Read | If the member is returned in the SELECT stored procedure. |
| Write | If the member needs to be sent in to an UPDATE stored procedure. |
| Not NULL | If the column representing the member should be marked as Not-Null |
| ID | This member is the ID to be used for indexing |
| Parent ID | The member is the parent container ID |
| Auto ID | The table definition should have IDENTITY for automatic ID |

FIGURE 5

| DB Object | Generation |
|---|---|
| Tables | Table definitions with columns qualified properly. It also allows for sharing tables between classes for optimization. |
| Indexes | Produces the primary key for the table using the Parent ID and the ID definitions for optimizing database access. It also produces additional indices in case other types of accesses are detected that are not on the primary key. |
| Constraints | Adds constraints for preserving integrity of the data so that child objects are not left around if the parent objects are deleted, |
| Procedures | The stored procedures are created to handle interactions of the database with the Object Model. They involve:<br>• Set – Insert or update the item into the database<br>• Get – Get an individual identifiable item from the database<br>• Gets – Get the collection of items in a rowset<br>• Del – Delete an individual identifiable item<br>• Dels – Delete items from the collection |
| Security | Adds appropriate database roles and secures the stored procedures and other database objects with these roles. |

FIGURE 6

FRAMEWORK FOR APPLYING OPERATIONS TO NODES OF AN OBJECT MODEL

TECHNICAL FIELD

The invention relates generally to data structures and object-oriented computer programming. More particularly, the invention relates to a framework for uniformly applying operations to nodes of a hierarchically structured object model.

BACKGROUND OF THE INVENTION

Computer software applications typically use data structures to store state information. As an application grows in size, the data structures tend to become complex and relatively difficult to manage. With the advent of the web and the adoption of XML as a default representation for objects, data-structure management and synchronization issues are typically done on a regular basis. A frequently occurring task is converting data from XML to an in-memory representation, such as C++ classes or COM objects. The in-memory representations are often typed objects that provide semantic checks as well as specify behavior.

Saving objects to XML is a task that developers often write repetitive code for. Services, such as a service for saving objects to XML, sometimes become out of synchronization with the data structures they operate on. A service and the corresponding data that the service operates on being out of synchronization is a common cause of bugs. Improved techniques for dealing with these issues would desirably mitigate software development cost by reducing the amount of repetitive code generated and by doing a better job of keeping code synchronized with data structures.

Traditional object-oriented solutions to situations of this type are to use objects that know what services are available to the objects. This type of conventional class-based design does not scale well. When a new service is to be added, the objects need to be revised. Distinct data structures within particular objects typically prevent other objects from readily leveraging the code in the particular objects.

Services for synchronizing data structures therefore should be uniformly applicable to substantially all objects to be synchronized within a system. As new services are added to the system, it would be desirable to have the objects of interest get the new services automatically.

SUMMARY OF THE INVENTION

A framework in accordance with an illustrative embodiment of the invention may be used for managing data-structure synchronization. Such a framework facilitates incorporating newer data structures in the future. The framework may offer services such as saving objects to XML, thereby relieving developers from having to write repetitive code to save objects to XML. It may also synchronize services with the data structures on which they operate, which is something that software developers would otherwise have to develop code for on a regular basis. The framework may be used to mitigate development costs by reducing the amount of repetitive code generated and by keeping the code synchronized with the corresponding data structures.

The framework may include services that may be uniformly applied to substantially all objects participating in the framework. As new needs arise, newer services may be added to enhance the framework. Substantially all of the objects participating in the framework may get the newer services automatically. The modular approach of abstracting out services from the data structures makes this possible.

Any changes made to a framework's object model may, advantageously, be automatically propagated out to external data representations, such as an XML representation and a database representation. The Framework makes it possible to synchronize the external schemas. It saves the developers effort from having to update and validate code as well as schema definitions for these disparate data representations. The services abstraction working in conjunction with techniques for traversing the common object model may be used for producing low cost, compact, yet highly reusable, services.

The framework may also be used to centralize the semantics for a software product. The end result is rapid application development with far fewer handcrafted lines than in traditional implementations. The total cost of ownership of the software product may therefore be dramatically lowered due to lower development and maintenance costs.

A framework in accordance with an illustrative embodiment of the invention may include an object model and services. The framework gathers information from metadata within classes of the object model that the framework operates on. The framework may gather the information from the metadata dynamically at runtime before the framework operates on the classes.

An object model in accordance with an illustrative embodiment of the invention may use one or more of the following types of hierarchies: derivation, container, and membership for structuring data stored within the object model. Within these three types of hierarchies, classes may be annotated such that, at run-time, useful information about how the data is organized for each of various ways of storing the data may be extracted from the annotations. This information may then be used by services of the framework for performing various operations in accordance with the information contained in the annotations.

For a class, a subclass may be generated for containing the annotation information. An annotation set within the subclass may then contain information specifying how members of the class should behave, including, but not limited to, which services of the framework the class member should participate in and how the class member should participate in the services.

To achieve synchronization, an in-memory representation of data, which may be implemented with C++ classes, may be annotated to indicate that a particular class member participates in an XML representation, for instance. The annotation may also indicate that the class member has various attributes, such as what node it will go into XML as and what its length is. Alternatively, or in addition, the in-memory representation of data may be annotated to indicate that a particular class member corresponds to particular data in a database representation, for instance, and that the class member has various attributes in the context of the database. The annotations may be used for indicating how services of the framework should persist data to various storage units, such as an XML file and/or a database table.

A framework in accordance with an illustrative embodiment of the invention may be used for generating an in-memory representation of data received in the form of an XML file, which is essentially a hierarchical representation of the data. A service of the framework may be used to operate on the XML file and transfer the data from the XML file into an in-memory representation of the data, which may constitute, at least in part, the framework's object model. Data within the object model may be annotated to indicate how the data is represented in various types of storage units, such as an XML file and a database table. Based on the content of the data received in an XML file, a service of the framework may then store data to the database in an appropriate database format, such as a database table, in accordance with annotations for the data within the object model. As will be apparent, an appropriate database data format or schema, such as a database table with columns and rows, may be significantly different from the data's representation, which, in this example, was an XML file, before the data was transferred to the object model.

In the context of the above example, in addition to the in-memory representation of the data by the object model, there may be two types of schemas, an XML schema and a database schema. The object model and services of the framework may be used for interoperating between these various ways of representing the data. When XML data changes, for instance, such as when a new XML node is added, the in-memory representation may be modified to include a representation of the new node. Changes of this type may also propagate themselves through to any other storage units that are pertinent to the newly added node.

Through annotations of class members within the object model, the framework may determine the various types of data within the framework. This data-type information may include the length of various pieces of data, how they relate to one another, and any other attribute of the data.

The framework may use the annotations to get information about the classes. The information provided enables the framework to traverse the objects, iterating through the various hierarchies and visiting each of the members. This uniform traversal of the tree enables the framework to provide services that are generic and that can work with classes added in the future.

Fine grain control may be used to indicate whether a member participates in a particular service, such as services for transferring data between the object model and one or more other types of data representations, such as XML and/or database representations. This type of information may be indicated in strings at the end of the annotations. These strings may be used to provide masks that the framework uses to check whether a member subscribes to a service.

Additional features and advantages of the invention will be apparent upon reviewing the following detailed description.

DETAILED DESCRIPTION OF THE INVENTION

I. Exemplary Operating Environment

Aspects of the invention are suitable for use in a variety of computing system environments, including distributed computing environments. In distributed computing environments, tasks may be performed by remote computer devices that are linked through communications networks. Embodiments of the invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention will be described in the general context of computer-executable instructions, such as services, that are executed by a personal computer or a server. Generally, services may include routines, programs, objects, components, data structures, etc., that perform particular tasks or implement particular abstract data types. Typically the functionality of the services may be combined or distributed as desired in various environments.

Embodiments within the scope of the invention may also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
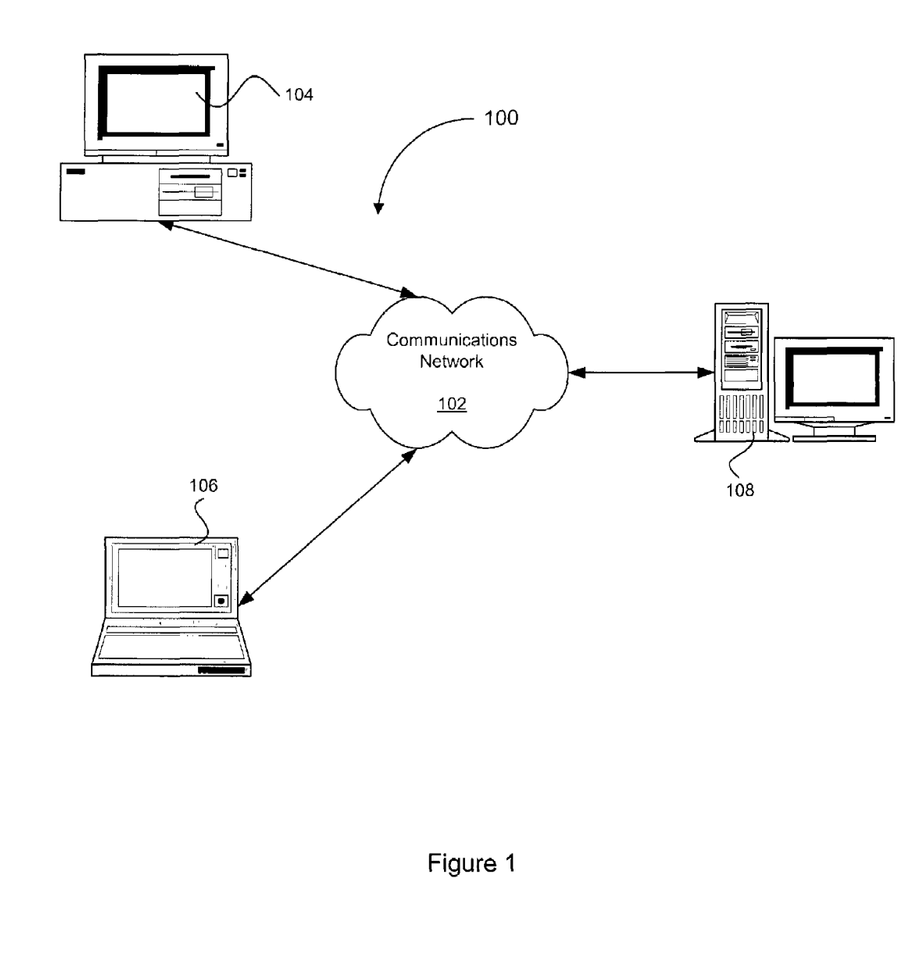
FIG. 1 is a schematic block diagram of a conventional distributed general-purpose digital computing environment that can be used to implement various aspects of the invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can comprise, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet.

Computer device 104, computer device 106, and computer device 108 may be coupled to communications network 102 through communication devices. Network interfaces or adapters may be used to connect computer devices 104, 106, and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computer devices 104, 106 and 108 may exchange content, applications, messages and other objects via communications network 102. In some aspects of the invention, computer device 108 may be implemented with a server computer or server farm. Computer device 108 may also be configured to provide services to computer devices 104 and 106. Alternatively, computing devices 104, 106, and 108 may also be arranged in a peer-to-peer arrangement in which, for a given operation, ad-hoc relationships among the computing devices may be formed.

II. Introduction to the Framework, Object Model, and Services

In accordance with an illustrative embodiment of the invention, a framework for applying operations to nodes of an object hierarchy may include an object model and services. The framework may provide an in-memory representation of data of interest within a system. The framework may support exchanging the data with physical storage units such as XML files and database tables. Objects in the system may expose type information about how their data is structured. The object model may use this type of information while performing various operations.

The framework may traverse the objects through various types of hierarchies as part of performing various operations. Various inventive aspects are discussed in the context of an object model implemented in the C++ programming language. As will be apparent, other suitable implementation choices also exist, including, but not limited to, other modern programming languages, such as C#.

Figure 2:
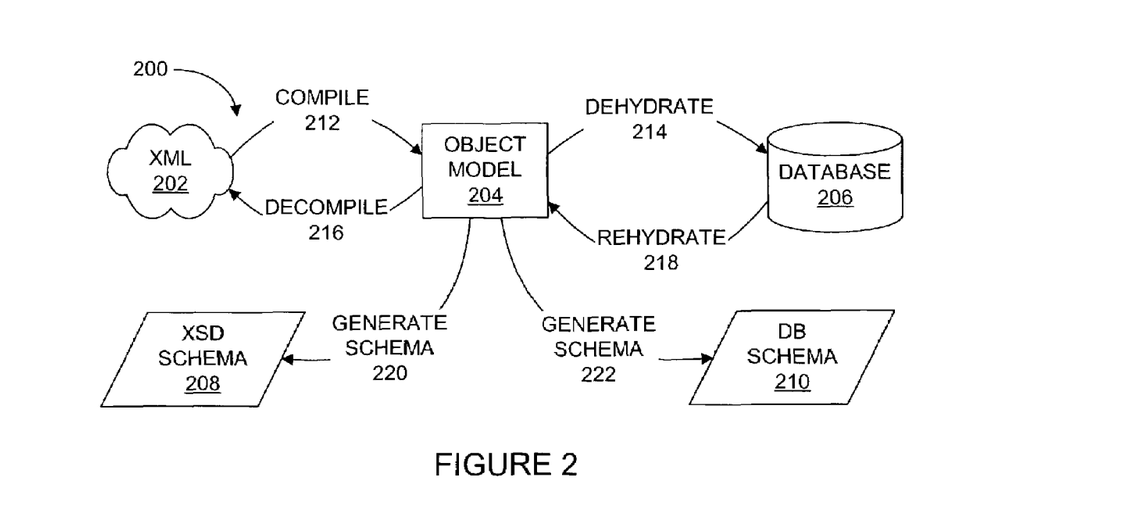
FIG. 2 is a schematic block diagram of a framework, having an object model and services, in accordance with an illustrative embodiment of the invention.

FIG. 2 is a schematic block diagram of a framework 200, in accordance with an illustrative embodiment of the invention. The framework 200 may include an object model 204 and services for transferring data between the object model 204 and various disparate data representations, such as the XML representation 202 and the database representation 206. Classes within the object model may be annotated to describe an object's data structure and how the object participates in various services, which may be used for storing data to multiple types of storage units, including, but not limited to XML files and a database tables.

In accordance with an illustrative embodiment of the invention, a website for a financial advisory firm may be hosted on a server, such as computer device 108, from which the firm's clients may use a computer device, such as computer device 106, to retrieve their investment data. A query of this type could be transmitted to the server via an XML file. The compile service 212 may then transfer information associated with the query to the object model 204. The rehydrate service 218 may then be used to obtain the queried data from the database 206 to the object model 204. The decompile service 216 may then be used to store the query results to an XML file, which may be used for generating an HTML file for displaying output to the firm's client. Similarly, data to be stored in the database 206 may be sent from an XML file to the object model 204 through the compile service 212 and from the object model 204 to the database 206 via the dehydrate service 214.

At a relatively high level of abstraction, the database services, dehydrate 214 and rehydrate 218, seem fairly symmetrical relative to the XML services, compile 212, and decompile 216. But, at a lower level of abstraction, the database services are starkly different in nature from the XML services because data is stored in the database 206 in tables having rows and columns while data is stored hierarchically in the XML 202. The object model and services of the framework manage the details associated with seamlessly transferring and synchronizing the data between these disparate types of data representations.

The framework 200 is able to handle arbitrarily structured nodes of data because, as discussed in more detail below, the framework examines annotations on the classes to determine how data is structured and how the data should be stored to various disparate types of data storage units.

III. Framework

A framework 200 in accordance with an illustrative embodiment of the invention may include an object model 204 and services. The framework gathers information from metadata within the classes of the object model 204 that the framework 200 operates on. The framework 200 gathers the information from the metadata dynamically at runtime before it operates on the classes. The types of information gathered about how the object model is structured can be broken down into three main types of hierarchies: derivation, container, and membership. These hierarchies are discussed below in Section III.A., entitled Object Model.

To achieve synchronization, an in-memory representation of data, such as C++ classes, may be annotated to indicate that a particular class member participates in the XML representation 202 and has various attributes, such as what node it will go into XML as and what its length is, for example. Alternatively, or in addition, the in-memory representation of data may be annotated to indicate that a particular class member corresponds to particular data in the database 206 and that the class member has various attributes in the context of the database 206. The annotations may be used for indicating how services of the framework 200 may persist data to various storage units, such as an XML file and/or a database table.

A framework 200 in accordance with an illustrative embodiment of the invention may be used for generating an in-memory representation of data received in the form of an XML file, which is essentially a hierarchical representation of the data. A service of the framework may be used to operate on the XML file and transfer the data from the XML file into an in-memory representation of the data, which may constitute, at least in part, the object model 204. Data within the object model 204 may be annotated to indicate how the data is represented in various types of storage units, such as an XML file and a database table. Based on the content of the data received in an XML file, a service of the framework may then store data to the database 206 in an appropriate database format, such as a database table, in accordance with annotations for the data within the object model 204. As will be apparent, an appropriate database data format or schema, such as a database table with columns and rows, may be significantly different from the data's representation, which, in this example, was an XML file, before the data was transferred to the object model 204.

In the context of the above example, in addition to the in-memory representation of the data by the object model 204, there may be two types of schemas, an XML schema 208 and a database schema 210. The object model 204 and services of the framework 200 may be used for interoperating between these various ways of representing the data. When XML data changes, for instance, such as when a new XML node is added, the in-memory representation may be modified to include a representation of the new node. Changes of this type may also propagate themselves through to any other storage units that are pertinent to the newly added node. The schemas for the storage (database and XML) may be regenerated to reflect the modification, which, in this example, is a new node. Another example of a change that may be reflected in various representations of data within a system would be changing the length of a character string, for instance, from 24 characters to 50 characters. If this is done in the in-memory representation (i.e. C++ classes), then the change may automatically get reflected in the in-XML schema representation and in the database schema representation as well.

Although various inventive aspects will be discussed in the context of C++ annotations for interoperating with XML files and database tables. Principles of the invention may be applied to other types of annotations, and data representations.

Through annotations of class members within the object model 204, the framework 200 may determine the various types of data within the framework. This data-type information may include the length of various pieces of data, how they relate to one another, and any other attribute of the data.

III.A. Object Model

In accordance with an illustrative embodiment of the invention, the object model's in-memory representation may be viewed as a centralized location from which changes are propagated out to the XML 202 and the database 206. The XML representation of the data may also be used for triggering changes to the other data representations. Using the object model's in-memory representation as the basis for rippling changes out to the XML 202 and database 206 advantageously allows for a single code base so that changes get applied uniformly across the various data representations.

The object model may generate an XML schema and/or a database schema and may apply node changes, updates, and the like uniformly regardless of what data has changed and where data has changed and the framework may effect appropriate updates to the database and/or XML representations.

An object model 204 in accordance with an illustrative embodiment of the invention may use one or more of the following types of hierarchies: derivation, container, and membership for structuring and traversing data stored within the object model 204. Within these three types of hierarchies, classes may be annotated such that, at run-time, useful information about how the data is organized for each of various ways of storing the data may be extracted from the annotations. This information may then be used by services of the framework 208 for performing various operations in accordance with the information contained in the annotations.

For each class, a subclass may be generated for containing the annotation information. An annotation set within a subclass may then contain information specifying how members of the class should behave, including, but not limited to, which services of the framework 200 the class member should participate in and how the class member should participate in the services.

The derivation, container, and membership hierarchies are each discussed in more detail in the next three sections.

III.A.1. Derivation Hierarchy

The derivation hierarchy is based on classes deriving from respective base classes. This is typically done to extend the functionality of the base class. A simplifying assumption may be made that there is one and only one base-class for each class. This assumption simplifies code, which is discussed below, for traversing the derivation hierarchy. This simplifying assumption is adequate for COM objects because MIDL allows only single inheritance.

The following example includes a type definition that defines CSecureIdentifiedObject as CPortfolio's base class:

```
class ATL_NO_VTABLE Cportfolio
    : public CSecureIdentifiedObject<CPortfolio, IPortfolio>
{
public:
    typedef CSecureIdentifiedObject<CPortfolio,
    IPortfolio> BASE_CLASS;
```

CPortfolio is an item that is derived from CSecureIdentifiedObject, which denotes being identifiable (i.e., having an ID) and having permissions. To annotate a class to specify "chaining," or how an item relates, or is linked, to another item within the system, a type definition may be used. Such a "typedef" may define a base class for a particular class. In accordance with an illustrative embodiment of the invention, respective base classes may be defined for substantially all classes within a system. A root class, however, is at the top of the derivation hierarchy and, therefore, will not have a base class defined. Base classes may be used to specify how classes "chain up," or link, to one another.

Figure 3:
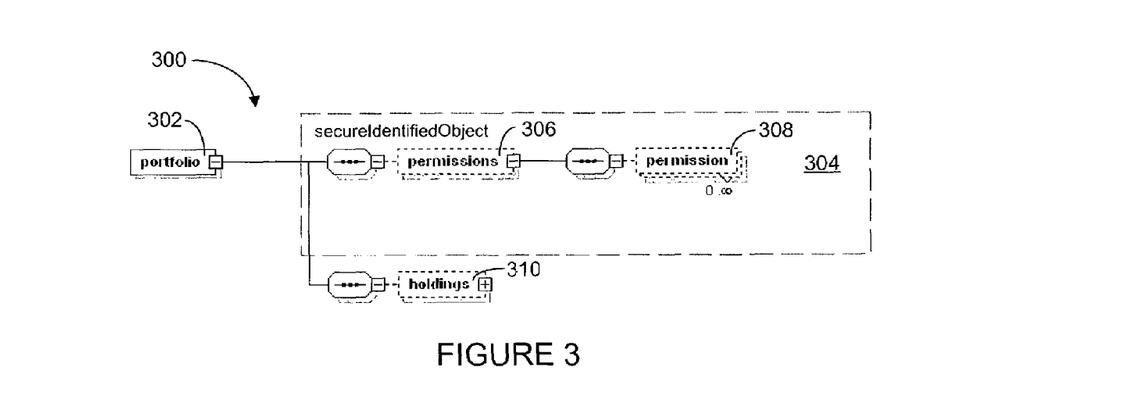
FIGS. 3 and 4 depict example XML schema representations illustrating various portions of a hierarchy of objects in accordance with an illustrative embodiment of the invention.

FIG. 3 depicts an XML Schema representation 300 corresponding to the CPortfolio type definition example above. SecureIdentifiedObject 304 is the base class and portfolio 302, which represents a group of investments held by an investor, is derived by extension from the base class secureIdentifiedObject 304. Portfolio 302 adds onto, or extends, the base class secureIdentifiedObject 304. The base class, secureIdentifiedObject 304 in this example, may contain items, such as permissions 306, that are common to all instances of secureIdentifiedObject 304. Permissions 306 may be an access control list that indicates which users have permission to review or edit the element being secured. Portfolio 302 obtains permissions 306 from secureIdentifiedObject 304 by extension. SecureIdentifiedObject 304 also includes one or more permission items 308, which each may be an access control entry that authorizes an individual user to access a secured element.

SecureIdentifiedObject 304 may also be extended in other ways. For instance, a document may be another instance of secureIdentifiedObject 304 and could extend secureIdentifiedObject 304 differently than the way portfolio 302 does. The base class, secureIdentifiedObject 304, would then contain functionality common to the base class irrespective of whether a derived item was a portfolio 302 or a document.

Holdings 310, which represents a collection of holdings in the portfolio 302 is depicted outside secureIdentifiedObject 304 to indicate that portfolio 302 adds holdings 310 by extension relative to what portfolio 302 obtains by derivation from secureIdentifiedObject 304.

A derivation hierarchy in accordance with the CPortfolio typedef example above and in accordance with FIG. 3 may be said to have portfolio 302 at a lowest level in the derivation hierarchy, which, through an annotation discussed below, chains up to secureIdentifiedObject 304 as portfolio's base class. Similarly, secureIdentifiedObject 304, in turn, may define a base class to chain up to an identifiedObject class, which, in turn, may chain up, through a base class definition, to an object, which may be the root.

III.A.2. Container Hierarchy

As discussed above in the previous section, portfolio 302 extends secureIdentifiedObject 304 through the derivation hierarchy. Holdings 310 is an item within the portfolio 302 container. Container hierarchy information relates to specifying a parent container in which a child object lives. This information may be used for generating schemas. It may also be used to push down context into a child object when a new object is created from a parent container. The contextual information may include a path to (or address of) the object within the overall layout of the object model. The contextual information about a portfolio with id 949 for a firm with id 1000 may be depicted in XPath syntax as:

firm[@id='1000']/portfolioManager/portfolios/portfolio[@id='949']

Figure 4:
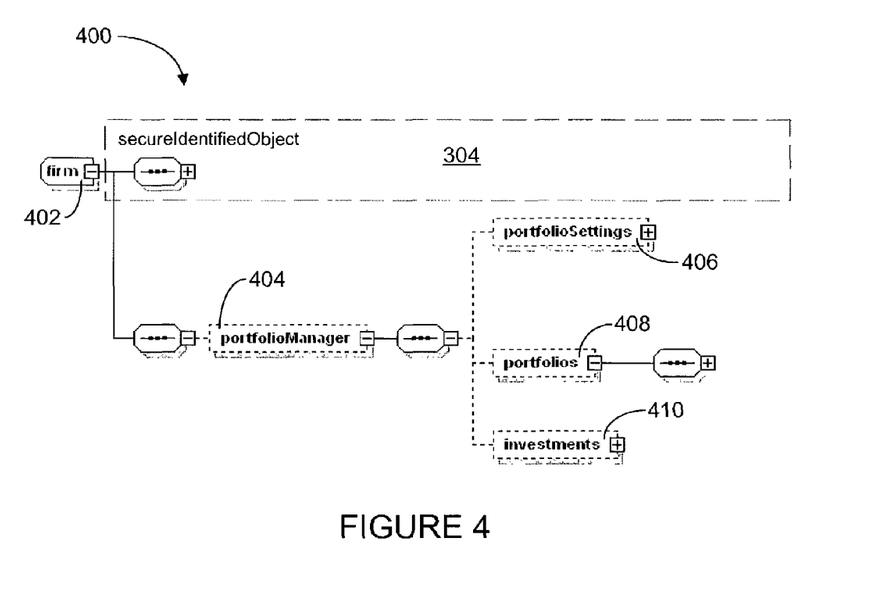

The following class definition and FIG. 4 provide an example of how the container hierarchy may be used for specifying parent-child relationships within the object model:

```
class ATL_NO_VTABLE Cportfolio
    : public CSecureIdentifiedObject<CPortfolio, IPortfolio>
{
    BEGIN_CLASS(CPortfolio, g_wszNSMAS,
    L"portfolio", L"Portfolios", L"Firms")
    ...
    END_CLASS ( )
};
```

This class definition and annotation specify that CPortfolio is a class that has a portfolio object within the class. Annotations of this type may be used for capturing container hierarchy information, which may be used for specifying what the members of the class are and what the properties on the class are that the class supports. Container hierarchy information of this type may be used for traversing the container hierarchy, as discussed below in Section III.B.2, entitled, Traversing the Container Hierarchy.

Referring to FIG. 4, in the XSD representation 400, a container hierarchy axis including a portfolios collection 408 is shown. Firm 402 may represent a particular financial advisory firm and is a parent container for portfolioManager 404, which may contain information about portfolios, investments, and settings that may affect calculation and display of investors' investment portfolios. PortfolioManager 404 is a parent container for portfolioSettings 406, portfolios 408, and investments 410. PortfolioSettings 406, portfolios 408, and investments 410 may be referred to as members of the portfolioManager 404 container. PortfolioSettings 406 may be settings that control the calculation and display of information about a portfolio and its holdings. Portfolios 408 may be a collection of investor portfolios, and investments 410 may be a collection of investments that may appear in portfolios.

III.A.3. Membership Hierarchy

The membership hierarchy is the way objects have references to other objects in the system. These references build a hierarchy of objects within the system. To avoid cyclical references, back-pointer references may be excluded from the hierarchy. Member objects that are reference counted by a current object may be placed in the membership hierarchy.

The membership hierarchy is similar to the container hierarchy discussed above in the previous section. A collection of portfolios will have portfolios and nothing else. This type of relationship relates to the container hierarchy. A portfolio may have different member objects, such as a holding object or a holdings collection, i.e. something different than a portfolio itself. A portfolio is not a collection itself. A portfolio can have references to other types of objects. Having disparate members in this way relates to the membership hierarchy.

The membership hierarchy may be discussed in the context of the following example portfolio class definition:

```
class ATL_NO_VTABLE CPortfolio
    : public CSecureIdentifiedObject<CPortfolio, IPortfolio>
{
    ...
    CComBSTRMAS              m_strName;
    CComBSTRMAS              m_strDescription;
    CComPtr<IHoldings>       m_pHoldings;
    CComPtr<IPortfolioPermissions>   m_pPermissions;
    BEGIN_CLASS(Cportfolio, g_wszNSNAS, L"portfolio",
    L"Portfolios", L"Firms")
        MEMBER(g_wszNSDef, L"permissions",
        COBJ(m_pPermissions), 0, "Xe")
        MEMBER(g_wszNSDef, L"name", CSTR(m_strName, 80),
L" ", "Crwi Xa Drw")
        MEMBER(g_wszNSDef, L"description",
CSTR(m_strDescription, 80), L" ", "Crwi Xa Drw")
        MEMBER(g_wszNSDef, L"holdings", COBJ(m_pHoldings),
        0, "Xe")
    END_CLASS ( )
}
```

In the CPortfolio class definition set forth above, the "public" statement tells the compiler where the derivation comes from. The base class information is omitted in this example. The first two entries, m_strName and m_strDescription are members that have a string name and a string description. These are C++ compiler constructs. Accordingly, absent the annotations that appear further down in the example code above, information about how these entries relate to other items within the system is unavailable at run-time. For the framework's services to synchronize various representations of the data and to be able to retrieve these as generic members of the class, information may be built into the class so that the information may be traversed for performing operations on these members.

Between the BEGIN_CLASS and END_CLASS, inclusive, is a non-standard construct, which may be referred to as a membership table. With this construct, the class is annotated with information about the members of the class. In this way, information about the members of the class becomes available to the framework 200 at run time. For instance, information provided by the annotations in the example above includes that the class has a permissions object, it has a name object, a description, and holdings.

The membership-table entry for holdings, for example, points to m_pHoldings, which is the class member defined before the membership table and which is available to the compiler. This information about m_pHoldings, which would otherwise be available only to the compiler at compile time, becomes externally available at run time due to the class structure specified in the membership-table annotation.

The compiler typically does not provide information about the class structure after compilation. Once the compiler builds executable code, there is no way to traverse this type of class layout. Information regarding how the classes are laid out is not accessible at run time. If a class member to be accessed is known, then it can be accessed. For instance, m_pHoldings may be used in other portions of code, and the compiler will do the resolution at compile time and provide access to it. Absent the annotations, though, there would be no way to find out at run-time what members the class has. Accordingly, annotations, in accordance with an illustrative embodiment of the invention may specify: (1) members of a particular class; and (2) how the class chains up to its base class within the derivation hierarchy. In this way, information about the class structure as it relates to classes extended through the derivation hierarchy also becomes accessible at run-time.

The membership-table annotations specify the names and the mappings to the class members. The annotations may also include information regarding how these mappings behave depending on what operation is being performed. For instance, an annotation might indicate that a class member gets stored to XML and/or that it gets stored to the database. Flags may be used to specify whether and/or how a particular item will participate in various services. Flags of this type are discussed below in this section.

For data within a class, various attributes are specified by the annotations in the membership table. Literals may refer to LONG or numeric values to be stored on the object. For instance, portfolio ID is a long. Literals could be LONGs or something, such as doubles or currency values with decimal points, that don't require extra storage space because they have a fixed length.

Strings, on the other hand, could have an arbitrary length. Since the database schema may not allow strings of arbitrary length to be defined, a maximum length may be specified. Therefore, the string may be annotated with a maximum allowable length. For instance, the class member name, m_strName, is annotated with a maximum length of 80 characters. In the XML schema, 80 characters may be indicated as the maximum length, and, in the database, a database column may be created to hold 80 characters for name. And so this maximum length of 80 characters gets reflected both in the XML 208 and in the database 210.

Membership tables having annotations of the type discussed above may be used for specifying what classes exist within a system and for specifying information about the classes. Based on the information contained in these membership tables, an XML schema 208 and/or a database schema 210 may be generated. How the framework should operate between the XML and database schemas may also be based on information from the membership tables. For instance, how to transfer properties from the XML 202 to the class and how to transfer properties back into XML 202 may be specified. Similarly, how to transfer data from the database 206 into the class and back into the database 206 may be specified. So these interchanges between various representations of data within the system may be based on annotated information within various membership tables of the framework's object model 204.

In the membership-table annotations in the example above, attributes for the objects are listed. The various types of attributes may include:

Literal→Literal types such as LONG and may include enumerations

String→Strings which may have a maximum length specified

Object→Sub objects

Vector→Collections of objects such as Portfolios

User→User defined object (assumes BYTE[cbSize])

Literals may be used for fixed length data. Strings may have a maximum length specified. Object refers to sub objects in the system, for instance, m_pHoldings is a sub object. It is an object that is similar to CPortfolio, but instead of CPortfolio it will point to a CHolding. It is a sub object that has a class structure similar to CPortfolio.

A vector refers to a collection. A vector may be thought of as listing member elements of a container. For example, a portfolios object will have a collection of portfolio objects. Portfolios collection may have individual portfolio items. To represent that, a vector of portfolio items may be used. The portfolios class could have a member called portfolio items, which is a vector of individual portfolio items.

User refers to a user-defined object, which may be an arbitrary object that does not fit any of the other types. For instance, under certain circumstances it may be desirable to simply send in a block of data to be saved opaquely (i.e. without processing the data). How transformations are performed on user-defined data may also be user-specified because services of the framework will typically be unable to automatically transfer the data due to a lack of class membership information and hierarchy information pertinent to the user-defined data.

The syntax of the membership table above will now be discussed. As will be apparent, other suitable syntaxes may also be used for specifying information of the type contained in the annotations. In the annotations, the first two parameters define the name that will be used in the XML for that member. The next parameter is a macro, such as COBJ or CSTR. This parameter describes what type of member it is in the class, such as an object or string. Then within parentheses is the name, such as m_pPermissions and m_pHoldings, of the C++ class's member. These membership-table entries, which appear between the begin class/end class, each correspond to a respective C++ definitions that appears before the membership table.

The entries in the membership table provide mappings to the C++ objects, which are defined above the membership table. So, an operation that deals with holdings, for instance, would be able to determine—from the holdings entry in the membership table—that holdings in XML is stored in m_pHoldings in the C++ in-memory representation of the object model 204.

Flags, such as Xe, Crwi, Xa, Drw, appear at the end of the membership-table entries. These flags may be used for specifying what services a member participates in and how the member participates in particular services. For instance, Xe may be used to specify that a member participates in XML as an element. Crwi indicates that the member is a COM object that can be read, written, and initialized. Xa means that it participates as an attribute in XML. Drw means that it can be read from, and written to, the database. Many other variations are possible, and the membership-table entries could grow much larger than the example entries shown above.

At a higher level of abstraction, the membership-table entries are specifying what services the class members participate in and how the members participate in those services. The membership-table entries may describe this type of information for substantially all of the members of the class. In addition, as discussed above, substantially all classes within the system may include a link to a base class. In this way, while traversing the membership, container, and derivation hierarchies, an operation will be able to determine what substantially all of the members of the class are, including members of the base classes from which each of the classes derives. These types of hierarchy information may be used for doing the XML transfers and/or database transfers, as discussed below in Section IV.A, entitled XML Services, and in Section IV.B, entitled Database Services.

III.B. Traversing Hierarchies

The framework 200 uses the annotations discussed above to gather data about the classes. This information enables the framework 200 to traverse the objects, iterating through the various hierarchies and visiting each of the members. This uniform traversal of the tree enables the framework 200 to provide services that are generic and that can work with classes added in the future.

Fine grain control may be used to indicate whether a member participates in a particular service. This type of information may be indicated in the strings at the end of the annotations. These strings may be used to provide masks that the framework uses to check whether a member subscribes to a service. Referring to the membership-table example in the previous section, example flags are shown in "name" where it is marked "Xa Drw," which indicates that it is an XML attribute and is persisted (Drw) to the database.

An example of a portion of code for traversing the hierarchies of the object model 204 is provided below.

```
class CObjectModel
{
    . . .
    //-------------------------------------------------------------------------------------------------------
    // @cmember Walks the hierarchy of the base classes.
    //
    template <class B>
    HRESULT HandleBase(
        /* [in] */ B* pDst,
        /* [in] */ CMemberInfo::OP op,
        /* [in] */ va_list vaParams)
    {
        CComarror ce;
        try
        {
            X(ce) << VerifyPointer(pDst);
            //
            // Obtain the table defining the object
            //
            WORD wSize;
            CMemberInfo* pMemInfo = B::CClassInfo::GetMemberInfo(&wSize);
            //
            // Transfer the data (depending on OP)
            //
            for (WORD wEntry=0; wEntry<wSize; wEntry++)
            {
                //
                // Base class
                //
                if (pMemInfo[wEntry] .m_vt== VT_ERROR)
                {
                    X(ce) << pDst->B::BASE_CLASS::HandleBase(
                            (B::BASE_CLASS*) pDst,
                            op,
                            vaParams);
                }
                //
                // Ignore entry if mask not set
                //
                if (!(pMemInfo[wEntry] .m_dwMask & op))
                    continue;
                X(ce) << HandleBaseDelegator(
                            pMemInfo + wEntry,
                            pDst,
                            op,
                            vaParams);
            }
        }
        catch (HRESULT hr)
        {
            return hr;
        }
        return S_OK;
    }
    //-------------------------------------------------------------------------------------------------------
    // @cmember Method called to delegate to the right service.
    //
    HRESOLT HandleBaseDelegator
        /* [in] */ CMemberInfo *pMamInfo,
        /* [in] */ PVOID pvDst,
        /* [in] */ CMemberInfo::OP op,
        /* [in] */ va_list vaParams)
    {
        CComErro ce;
        try
```

```
    {
        switch (op)
        {
        case CMemberInfo::OP_COM_INIT:
            X(ce) << PropertyInit(pMamInfo, pvDst);
            break;
        case CMemberInfo::OP_XML_READ
            X(ce) << XmlRead(pMemInfo, pvDst, va_arg( vaParams, IXMLDOMElement
*));
            break;
            ...
        ...
    }
};
```

The example code above is for traversing the information contained in the annotations. This routine, HandleBase, has three input parameters: B, which is an object pointer; CMemberInfo, which specifies an operation to be performed, such as a transfer from XML 202 to the object model 204 or a transfer from the object model 204 to the database 206, or the like; and va_list, which may take additional arbitrary parameters associated with the operation to be performed. How HandleBase works is discussed in the next two sections.

III.B.1. Traversing the Derivation Hierarchy

As previously discussed, in the derivation hierarchy, substantially all classes within the object model 204 may define a base class, which may be specified in an annotation, such as the example typedef discussed above in Section III.A.1, entitled Derivation Hierarchy. This example typedef is reproduced below

```
class ATL_NO_VTABLE CPortfolio
    : public CSecureIdentifiedObject<Cportfolio, Iportfolio>
{
public:
    typedef CSecureIdentifiedObject<CPortfolio,
    IPortfolio> BASE_CLASS;
```

Base-class annotations of this type make it possible to traverse the object model's derivation hierarchy by moving from one or more derived classes to each derived class's base class. For instance, suppose a call to HandleBase has been made and that CPortfolio was passed in as the object pointer input parameter, B*. The typedef defines CSecureIdentifiedObject as the base class for CPortfolio class. Any class within the object model may be queried regarding what the class's base class is. In response, the class may respond with what the class's base class is based on the class's base-class definition. So, to traverse the derivation hierarchy, a recursive call to HandleBase may be made with CSecureIdentifiedObject, which is CPortfolio's base class, input as the object pointer input parameter, B*, for the recursive call.

Referring to FIG. 3, portfolio's base class would point from portfolio 302 into the secureIdentifiedObject 304. Suppose the operation to be performed is to do XML property transfers of data from XML 202 into an in-memory representation, such as a C++ object. Suppose an XML file was received and that the XML file contains a portfolio ID, permissions, and other attributes to be transferred to the in-memory representation. The framework may query portfolio 302 to find out whether ID is a member of portfolio 302. If the response to the query is that ID is a member of portfolio 302, then ID within portfolio 302 may be set in accordance with the ID data from the XML file.

Suppose the XML file contains permissions data. The framework may query portfolio 302 to find out whether permissions is a member of portfolio 302. For permissions, the response would be that permissions is not a member of portfolio 302. In response, the framework may traverse the derivation hierarchy to determine whether permissions 306 is a member of portfolio's base class, secureIdentifiedObject 304. If the response to the query is that permissions 306 is a member of secureIdentifiedObject 304, then permissions 306 within secureIdentifiedObject 304 may be set in accordance with the permissions data in the XML 202.

This example deals with traversing the derivation hierarchy from a derived class upward toward a base class. As will be apparent, an object model may have multiple levels and a derivation hierarchy traversal may go through multiple base classes before finding a property of interest. If the derivation hierarchy is traversed to the root without finding the property to be set, then an error condition may be declared.

Referring again to the HandleBase routine, information about an object's definition may be gathered via the call to GetMemberInfo, which may obtain the class's member information from the membership table, such as the information contained in the membership-table annotations discussed above in Section II.A.3, entitled Membership Hierarchy. As a result, pMemInfo will iterate over the members based on the annotations in the membership table.

A loop iteration is then performed for each member of the class specified in pMemInfo. Within the loop, a check is performed to see whether the member for the current loop iteration is defined within the class or whether it is derived from a base class. If the member is derived from a base class, then derivation traversal will be performed by recursively calling HandleBase and passing in the current class's base class. Otherwise, if the member is defined with the current class, then a membership traversal may be done by calling HandleBaseDelegator to perform the operation, such as an XML property transfer. Membership traversal is discussed in the next section.

III.B.2. Traversing the Container and Membership Hierarchies

As discussed above, the example class definition and annotation in Section III.A.2, entitled Container Hierarchy, specify that CPortfolio is a class that has a portfolio object within the class. To determine whether a class contains a particular member, the membership table may be traversed.

As discussed above in Section III.A.3, entitled Membership Hierarchy, CPortfolio exposes the members listed in CPortfolio's membership table, such as m__pPermissions and m__pHoldings. Stated differently, the portfolio object has m__pHoldings, which is a member of the portfolio class. So, when the membership hierarchy is being traversed for setting holdings on the portfolio object, holdings may be found in CPortfolio's membership table.

For a particular operation on a particular class, if a recursive call to HandleBase is not needed for traversing the derivation hierarchy, then the membership hierarchy may be traversed. As part of traversing the membership hierarchy to perform the operation, a flag within the membership table annotation may be checked to determine whether an object to be updated subscribes to the operation. For instance, if the operation to be performed is an XML transfer, but the object to be updated does not subscribe to this operation, the object is not updated. This is indicated in the HandleBase routine above by the comment that says "ignore entry if mask is not set."

If information in the membership table indicates that the object does participate in the update operation, then HandleBase calls HandleBaseDelegator, which tries to perform the specific operation, such as PropertyInit, XmlRead, and the like on the object.

As the membership hierarchy is traversed and operations are performed, the framework looks at the membership-table information of the class. But, advantageously, the framework does not need to know the meaning of any particular class member. The framework determines that there is a member for which initialization should be performed or for which an XML transfer should be done without the framework needing to know what that member is. Stated differently, the HandleBase and HandleBaseDelegator code does not say that it is working on portfolio, or on an ID, or whatever type of object it happens to be working on. Instead, it works on an object with a name, such as ID, and a type that is known to the framework. For instance, the type for ID is long, which is fixed length. ID can be initialized. And the framework 200 has available to it information specifying that the ID being operated on corresponds to the XML representation of ID due to the names specified in the pertinent membership-table annotation. The framework may then use this information for performing property transfers. Stated differently, these transfers are performed generically. The class's annotation information may specify that a class member subscribes to one or more services, such as services for doing XML transfers and services for doing database transfers. Services are discussed in the next three sections.

IV. Services

The framework 200 may form, at least in part, the application layer for a web-based application, such as an application that hosts web sites for financial advisory firms. A framework 200 in accordance with an illustrative embodiment of the invention may service requests that come into the web site and may include services to interoperate with data stored in XML 202 and data stored in a database 206. FIG. 2 depicts several services of this type, such as compile 212, decompile 216, dehydrate 214, and rehydrate 218.

The XML services and database services use the flags, such as Xe, Crwi, Xa, Drw, which appear at the end of the membership-table entries and which are discussed above in Section III.A.3, entitled Membership Hierarchy.

Relative to the XML 202, the database generally requires more information about the type of information to be stored. For instance, is the data item nullable? Can the data be absent? Is the data required? And does the database generate an ID for the item or not? XML typically does not express information like this, which relate essentially to semantic logic about the system.

This type of information may be specified in accordance with an illustrative embodiment of the invention. For instance, is it an ID field or not? If it is an ID field, database lookups may be optimized by building indices. So, if an index is built for look up, it may be indexed based on how the database is typically accessed.

XML 202 may be compiled 212 into the object model 204. This may be thought of as bringing properties from the XML 202 into the object model 204. The term "compile" as used herein does not refer to compiling source code into executable modules. Rather compiling herein refers to essentially importing data, such as XML data, into the in-memory image or representation of the object model 204. The decompile service 216 pushes data from the object model 204 into the XML 202. To decompile 216 means to convert the memory image back into XML format.

When compiling 212 the XML 202 substantially all attributes in the XML 202 may be transferred to a member in the object model 204. To do this, the compile service 212 may traverse the various hierarchies to determine which XML nodes subscribe to the compile service 212. For XML nodes that subscribe to the compile service 212, the node's attributes from XML 202 may be put into a form expected by the object model 204, as specified in the membership table, and may then be pushed into the object model 204.

To get data from the XML representation 202 and save the data to the database 206, the XML 202 may be compiled 212 to the object model 204 to make a memory image of the data. The data may be validated and/or other processing may be performed. Then the data may be dehydrated 214 to the database 206.

In response to an XML request to retrieve data from the database 206, a compile 212 from the XML 202 to the object model 204 may be done. The data to be retrieved may then be rehydrated 218 from the database 206 to the framework 204. The retrieved data may then be decompiled 216 into XML 202 for outputting the retrieved data. XSL transformations may then be done to generate HTML from the XML 202 representation of the retrieved data.

The framework 200 abstracts from the XML 202 how the database 206 stores the data. Similarly, the framework abstracts from the database 206 how the XML 202 stores the data. Similarly, the application layer of the example web site for hosting financial advisory firm web pages, does not need to know how the data is stored. Instead, the application layer may interact with the object model with high-level operations and may leave to the framework 200 the details of doing the transfers between the XML 202 and the database 206.

Advantageously, a single framework 200 handles arbitrarily structured nodes because it examines the information in the classes to determine what type of node it is dealing with.

IV.A. XML Services

As discussed above, framework 200 reads the annotations of the classes. The qualified names of the classes and their members are present in the membership-table annotations. The annotation on the member may tell the framework 200 how the member is represented in XML 202. Incoming data that conforms to the XSD schema 208 may be read in automatically by a generic member-wise XML property copy routine, which may be referred to as the compile service 212.

Requests that ask for XML output from the framework 204 may be written automatically by a generic member-wise XML property writer routine, which may be referred to as the decompile service 216. The XML schema definition (XSD) 208 may be prepared by the framework 200 by traversing the hierarchies and representing the object model 204 in the XSD 208. Each class participating in the XML service may get represented in the XSD 208 as a complexType. The derivation hierarchy is traversed to depict that the complexType derives from another base complexType through extension. The membership hierarchy is traversed by the framework 200 to define the contents of the complexType. In case an annotation contains "Xe", the corresponding member is added within a sequence of sub elements within the complexType. If a member contains the annotation "Xa", the member is depicted as an attribute within the complexType. The permissible values for an attribute or the element-body of a complexType may be further restricted by providing an appropriate type. For example, CStr may be defined to be a string type with a maxLength of 80 characters. Additional schema constructs may include, but are not limited to, enumeration of values the data is restricted to, specifying whether the node is required or optional use, the permissible range for a node to appear through maxOccurs and minOccurs, regular expression patterns for data to conform to, a default value for when data is not supplied, and annotations for providing documentation on a node.

IV.B. Database Services

The object model 204 may use database-operations annotations for defining a database schema 210. These annotations may be used for qualifying the columns in the database table definitions and they may be used for creating database objects or items, such as tables and stored procedures. An example set of database annotations are set forth in the table of FIG. 5.

Figure 5:
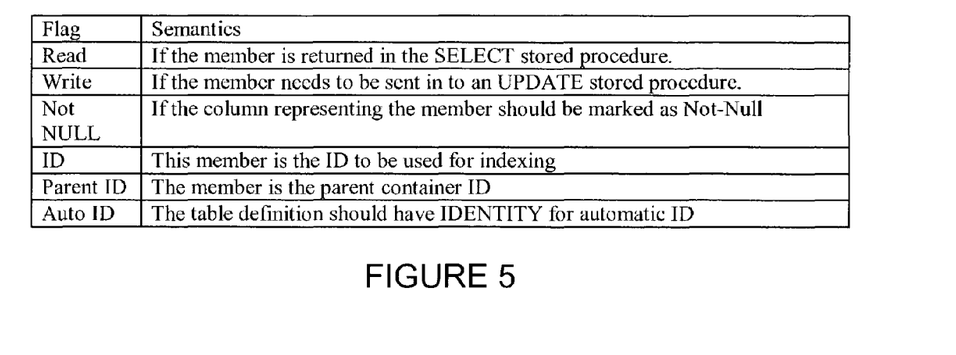
FIG. 5 is a table containing an example set of database annotations in accordance with an illustrative embodiment of the invention.

Generating database scripts, such as SQL scripts, with the annotations shown in FIG. 5 is an example that shows how the framework 200 may keep the database schema 210 and the objects synchronized. The framework 200 may read these annotations to produce SQL scripts. The script generation service may walk substantially all objects that need persistence to the database 206. A template may then be used for generating the script.

Figure 6:
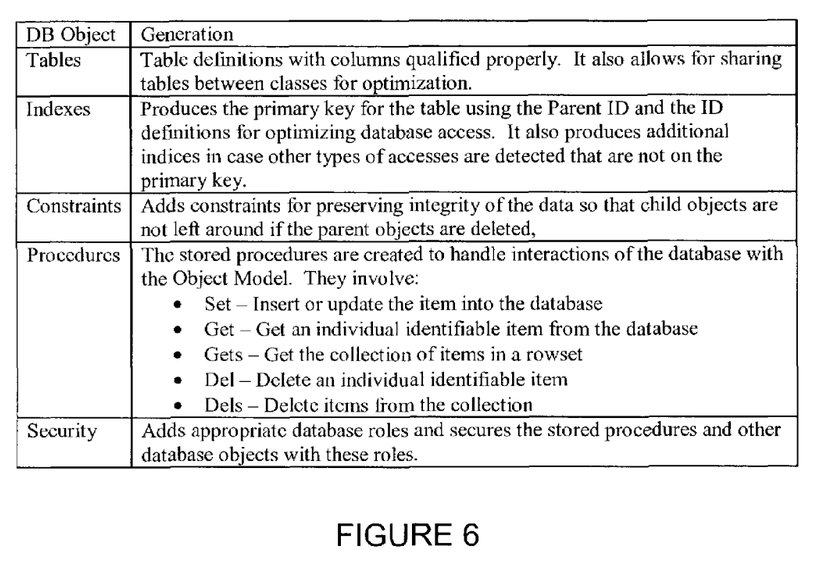
FIG. 6 is a table containing an example set of database-related objects that may be generated in accordance with an illustrative embodiment of the invention.

Referring to the table in FIG. 6, database tables may be created for storing data to the database 206. For instance, a portfolios table may include columns for an ID, for permissions, and for name. These columns may be used dynamically at run time for generating the portfolio table in the database. As previously discussed, indices for accessing the data in the database may be built.

When a child object is located within a parent object or container, constraints may be imposed on the parent object so that, if the parent object is deleted, then the parent object's child objects will be automatically deleted. In this way, these constraints may leverage the database's automatic referential integrity features to effectively manage these parent-child relationships. For instance, if the parent ID is deleted, the database may then automatically delete the child IDs.

Stored procedures may be created. Actions, such as Set, Get, Gets, Del, Dels, may be used to handle interactions of the database with the object model. These actions may be translated into stored procedures, such as one or more SQL statements, to handle these operations. A stored procedure may also be created for checking permissions, for example. Since a document object is a secureIdentifiedObject 304, there may be a permission table associated with the document object. The permission table may be used to generate a stored procedure such that only users that have permission will be allowed to perform certain operations on the document object. In this way, the document's permissions information from the object model 204 may be incorporated into the process of creating a stored procedure.

Use of this type of information may extend beyond creating stored procedures. For instance, information from the object model 204 may be used to specify what type of users can access which stored procedures. For instance, investors may be able to access only some of the stored procedures, whereas an administrator may be able to access substantially all of the stored procedures.

The annotations in the classes allow the framework to transfer changes that were made in the object model 204 to the database 206 and to the XML 202, if the modified data subscribes to corresponding services. Accordingly, when a change is made to one representation of the data, such as in the object model 204, the XML 202, or the database 206, it may affect the form factors (i.e., how the data gets formatted and/or organized for storage) in one or more of the other data representations. For example, when the database tables, and their layout, are prepared, the schema for storing data to the database tables may be altered by altering how the object model is structured. For instance, if name is specified with a maximum length of 80 characters, a column in the database with 80 characters may be prepared for the name. So data from the object model may be used for preparing (i.e., creating) the database tables as well as storing data to the database tables.

What has been described above is merely illustrative of the application of the principles of the invention. Those skilled in the art can implement other arrangements and methods without departing from the spirit and scope of the present invention. Any of the methods of the invention can be implemented in software that can be stored on computer disks or other computer-readable media.

I claim:

1. A framework for applying operations to nodes of an object model, the framework comprising:
   metadata within the object model, wherein the metadata:
   is available at run-time,
   specifies hierarchical relationships between nodes of the object model, and
   specifies data-type information for nodes of the object model;
   a hierarchy-traversal routine that includes computer-executable instruct ons that, when executed, traverse the specified hierarchical relationships to gather, from the metadata at run-time, information that is pertinent to applying operations to nodes of the object model;
   an operations-application routine that includes computer-executable instructions that, when executed, apply operations to nodes of the object model in accordance with the information gathered at run-time from the metadata;
   wherein the metadata specifies at least one service of the framework to which at least one of the nodes subscribes; and
   wherein the at least one service includes at least one of:
   a compile service that transfers data from an XML representation to the object model;
   a decompile service that transfers data from the object model to an XML representation;
   a dehydrate service that transfers data from the object model to a database representation;

a rehydrate service that transfers data from a database representation to the object model;

an xml schema generation service that produces an XML schema definition that the compile and decompile services conform to; and a database schema that is used to configure the database to host data for the dehydrate and rehydrate services.

2. The framework of claim 1, wherein, for an operation that is to be performed on a particular node, the hierarchy-traversal routine traverses a hierarchy to find a class of which the particular node is a member, wherein a type of the hierarchy traversed is selected from the group consisting of: a derivation hierarchy, a membership hierarchy, and a container hierarchy.

3. The framework of claim 1, wherein the metadata includes a respective base-class definition for substantially all classes defined within the object model, except that no base class is specified for a root class, which does not derive from any other class.

4. The framework of claim 1, wherein the metadata includes membership annotations that specify what members are exposed by substantially all classes within the object model.

5. The framework of claim 1, wherein the metadata specifies how the at least one of the nodes participates in the at least one service to which the at least one of the nodes subscribes.

6. The framework of claim 2, wherein, the hierarchy-traversal routine traverses the derivation hierarchy by recursively calling the hierarchy-traversal routine and passing a current class's base class as an input parameter each time the hierarchy-traversal routine recursively calls itself.

7. The framework of claim 2, wherein the database-schema generation routine creates a type of database storage item selected from the group consisting of: table definitions, indexes for database access, constraints for preserving referential integrity among database items, stored procedures for handling database interaction with the object model, and database security policies.

8. A framework for applying operations to nodes of an object model, the framework comprising:

metadata within the object model, wherein the metadata:
is available at run-time,
specifies hierarchical relationships between nodes of the object model, and
specifies data-type information for nodes of the object model;

an operations-application routine that includes computer-executable instructions that, when executed, apply operations to the nodes in accordance with information available at runtime from the metadata;

a plurality of services that include computer-executable instructions that, when executed, transfer data, between the object model and disparate types of persistent data representations, in accordance with information that is available at run-time from the metadata;

wherein:
a first pair of services transfers generic data items between the object model and a first of the disparate types of persistent data representations, and
a second pair of services transfers generic data items between the object model and a second of the disparate types of persistent data representations;
wherein the metadata specifies which of the pairs of services each of a plurality of nodes subscribes to;
wherein the disparate types of persistent data representations are an XML representation and a database representation; and wherein, when a change is made, in the XML representation, the object model, or the database representation, to data of, or metadata corresponding to, a node that participates in both the first pair of services and the second pair of services, the change is automatically propagated to any of the data representations, including the object model, other than the data representation in which the change was made.

9. The framework of claim 8, wherein the metadata includes a respective base-class definition for substantially all classes defined within the object model, except that no base class is specified for a root class, which does not derive from any other class.

10. The framework of claim 8, wherein the metadata includes membership annotations that specify what members are exposed by substantially all classes within the object model.

11. At least one computer-readable media having stored thereon a data structure containing metadata of an object model of a framework for applying operations to nodes of the object model, the metadata being available at run-time and comprising;

information that specifies
hierarchical relationships between nodes of the object model,
data-type information for nodes of the object model,
at least one service of the framework to which at least one of the nodes subscribes, and
how the at least one of the nodes participates in the at least one service to which the at least one of the nodes subscribes; and wherein the at least one service includes at least one of:
a compile service that transfers data from an XML representation to the object model;
a decompile service that transfers data from the object model to an XML representation;
a dehydrate service that transfers data from the object model to a database representation;
a rehydrate service that transfers data from a database representation to the object model;
an xml schema generation service that produces an XML schema definition that the compile and decompile services conform to; and
a database schema that is used to configure the database to host data for the dehydrate and rehydrate services.

12. The computer-readable media of claim 11, wherein the metadata includes a respective base-class definition for substantially all classes defined within the object model, except that no base class is specified for a root class, which does not derive from any other class.

13. The computer-readable media of claim 11, wherein the metadata includes membership annotations that specify what members are exposed by substantially all classes within the object model.

14. A commuter-implemented method of applying operations to nodes of an object model, the method comprising;

traversing hierarchical relationships between nodes of the object model to gather, at run-time from metadata of the object model, information that is pertinent to applying operation to nodes of the object model; and applying operations to nodes of the object model in accordance with the information gathered at run-time from the metadata;

wherein the metadata specifies at least one service of the framework to which at least one of the nodes subscribes; and wherein the at least one service includes at least one of:
- a compile service that transfers data from an XML representation to the object model;
- a decompile service that transfers data from the object model to an XML representation;
- a dehydrate service that transfers data from the object model to a database representation;
- a rehydrate service that transfers data from a database representation to the object model;
- an xml schema generation service that produces an XML schema definition that the compile and decompile services conform to; and
- a database schema that is used to configure the database to host data for the dehydrate and rehydrate services.

15. The method of claim 14, wherein, for an operation that is to be performed on a particular node, the method further comprises:
traversing a hierarchy to find a class of which the particular node is a member, wherein a type of the hierarchy traversed is selected from the group consisting of: a derivation hierarchy, a membership hierarchy, and a container hierarchy.

16. The method of claim 14, wherein the metadata includes a respective base-class definition for substantially all classes defined within the object model, except that no base class is specified for a root class, which does not derive from any other class.

17. The method of claim 14, wherein the metadata includes membership annotations that specify what members are exposed by substantially all classes within the object model.

18. The method of claim 14, wherein the metadata specifies how the at least one of the nodes participates in the at least one service to which the at least one of the nodes subscribes.

* * * * *

UNITED STATES PATENT AND TRADEMARK OFFICE
CERTIFICATE OF CORRECTION

PATENT NO. : 6,973,460 B1
APPLICATION NO. : 10/304222
DATED : December 6, 2005
INVENTOR(S) : Kanchan Mitra It is certified that error appears in the above-identified patent and that said Letters Patent is hereby corrected as shown below:

On the title page, item (74), in "Attorney, Agent, or Firm", in column 2, line 1, after "Ltd" insert -- . --.

On Sheet 4 of 4, Fig. 6 (Row 4, Col. 2), line 2, after "deleted" delete "," and insert -- . --, therefor.

In column 5, line 36, delete "moden" and insert -- modern --, therefor.

In column 8, line 11, delete "Cportfolio" and insert -- CPortfolio --, therefor.

In column 9, line 22, delete "Cportfolio" and insert -- CPortfolio --, therefor.

In column 10, line 18, delete "Cportfolio, g_wszNSNAS," and insert -- CPortfolio, g_wszNSMAS, --, therefor.

In column 10, line 19, delete "L"Firins")" and insert -- L"Firms") --, therefor.

In column 10, line 28, delete "}" and insert -- } ; --, therefor.

In column 14 (Table), line 13, delete "CComarror" and insert -- CComError --, therefor.

In column 14 (Table), line 58, delete "HRESOLT" and insert -- HRESULT --, therefor.

In column 14 (Table), line 58, after "HandleBaseDelegator" insert -- ( --.

In column 14 (Table), line 59, delete "*pMamInfo," and insert -- *pMemInfo, --, therefor.

In column 14 (Table), line 64, delete "CComErro" and insert -- CComError --, therefor.

In column 15 (Table 1), line 5, delete "(pMamInfo," and insert -- (pMemInfo, --, therefor.

In column 15 (Table 1), line 7, after "OP_XML_READ" insert -- : --.

UNITED STATES PATENT AND TRADEMARK OFFICE
CERTIFICATE OF CORRECTION

PATENT NO. : 6,973,460 B1
APPLICATION NO. : 10/304222
DATED : December 6, 2005
INVENTOR(S) : Kanchan Mitra It is certified that error appears in the above-identified patent and that said Letters Patent is hereby corrected as shown below:

In column 15, line 34, after "below" insert -- . --.

In column 15, line 38, delete "<Cportfolio, Iportfolio>" and insert -- <CPortfolio, IPortfolio> --, therefor.

In column 20, line 49, in Claim 1, delete "instruct ons" and insert -- instructions --, therefor.

In column 21, line 1, in Claim 1, delete "rehydate" and insert -- rehydrate --, therefor.

In column 22, line 22, in Claim 11, after "comprising" delete ";" and insert -- : --, therefor.

In column 22, line 56, in Claim 14, delete "commuter-implemented" and insert -- computer-implemented --, therefor.

In column 22, line 57, in Claim 14, after "comprising" delete ";" and insert -- : --, therefor.

In column 22, line 61, in Claim 14, delete "operation" and insert -- operations --, therefor.

Signed and Sealed this

Twenty-eighth Day of July, 2009

JOHN DOLL
*Acting Director of the United States Patent and Trademark Office*